(12) United States Patent
Mackett

(10) Patent No.: US 6,694,700 B1
(45) Date of Patent: Feb. 24, 2004

(54) FASTENER ATTACHING FRAME MEMBERS OF A PATIO ENCLOSURE

(76) Inventor: Kraig D. Mackett, 333 Cove Harbour Dr. West, Holland, OH (US) 43528

( * ) Notice: Subject to any disclaimer, the term of this patent is extended or adjusted under 35 U.S.C. 154(b) by 0 days.

(21) Appl. No.: 09/543,434

(22) Filed: Apr. 5, 2000

(51) Int. Cl.[7] .................................................. E04B 1/61
(52) U.S. Cl. ........................ 52/764; 403/230; 403/231; 403/403; 403/205; 52/528.2; 52/584.1; 52/712; 52/714; 52/655.1; 52/656.4; 52/736.2; 52/633; 52/650.3; 52/653.1; 52/273; 411/402; 411/403; 411/404; 411/531; 411/533
(58) Field of Search ............................... 403/230, 231, 403/403, 205; 52/528.2, 584.1, 764, 712, 714, 655.1, 656.9, 736.2, 633, 650.3, 653.1, 273; 411/402, 403, 404, 531, 533

(56) References Cited

U.S. PATENT DOCUMENTS

| | | | |
|---|---|---|---|
| 3,642,310 A | * 2/1972 | Hudson | 287/54 |
| 4,561,227 A | 12/1985 | Austin | |
| 4,572,694 A | * 2/1986 | Hoeksema | 403/187 |
| 4,630,550 A | * 12/1986 | Weitzman | 108/155 |
| 4,872,297 A | 10/1989 | Hetzel et al. | |
| 4,875,311 A | 10/1989 | Meyers | |
| 5,143,472 A | * 9/1992 | Reed et al. | 403/230 |
| 5,647,172 A | 7/1997 | Rokicki | |
| 5,685,662 A | * 11/1997 | Rollin et al. | 403/231 |
| 5,794,395 A | * 8/1998 | Reed | 52/298 |
| 5,850,843 A | * 12/1998 | Mahood et al. | 135/88.06 |
| D419,431 S | * 1/2000 | Hollis | D8/387 |

* cited by examiner

Primary Examiner—Carl D. Friedman
Assistant Examiner—Steve Varner
(74) Attorney, Agent, or Firm—MacMillan, Sobanski & Todd, LLC

(57) ABSTRACT

A fastener for use in forming a joint of a framework for a patio enclosure. The joint includes an end of an elongated first frame member fastened to a side of an elongated second frame member. The fastener includes a body having a first end and a second end defining an outer surface therebetween. The second end is adapted to fit in a hollow portion of the first frame member. The fastener further includes a plate extending outwardly from the body. The plate is adapted to be fastened to the side portion of the second frame member. A stop extends outwardly from the outer surface of the body. The stop provides for positioning of the fastener relative to the first frame member when the second end is positioned within the hollow portion of the first frame member.

15 Claims, 5 Drawing Sheets ial to the inner core. The frame members 102 and 104 include outwardly extending ribs 112 to form tracks for retaining doors, windows, and panels of the patio enclosure. The insert 106 is generally U-shaped having a pair of spaced apart parallel legs 114 joined by a web 116. The insert 106 and the inner cores 110 of the frame members 102 and 104 are formed of aluminum, a relatively rigid material.

FASTENER ATTACHING FRAME MEMBERS OF A PATIO ENCLOSURE

BACKGROUND OF THE INVENTION

This invention relates in general to the construction of building structures, and in particular to a fastener for attaching frame members of a patio enclosure.

Patio enclosures are typically constructed with a plurality of elongated beams or frame members which are fastened to one another to form a framework. The framework generally provides the structural integrity and shape of the patio enclosure. Panels, screens, windows, and doors are commonly inserted between various frame members to form an enclosed structure. The frame members can be oriented vertically, horizontally, or angled with respect to one another. Additionally, a roof structure can be installed over the patio enclosure.

The frame members are relatively narrow compared to their length. Frame members have been constructed out of many types of materials, such as wood, aluminum, and polymeric materials, such as vinyl. In recent times, frame members have been formed from multiple materials to form a composite frame member. A composite frame member generally has an inner core covered by an outer casing. The outer casing is made of a different material than the inner core. For example, the inner core can be a relatively rigid material, such as wood or aluminum, which provides rigidity and the structural integrity for the frame member. The outer casing or skin can be made of a suitable material having weather resistant properties and which is aesthetically pleasing, such as vinyl or other suitable polymeric materials. If vinyl or other polymeric materials are used for the outer casing, the outer casing can be manufactured using an extrusion process, and is preferably formed with a hollow interior. The inner core is inserted into the hollow interior of the outer casing to form a frame member having a relatively rigid structure and having exceptional wear properties for withstanding an outdoor environment.

Frame members are supplied in various cross-sectional shapes depending on their application and location in the patio enclosure. Commonly, the cross-sectional shape of frame members is generally square or rectangular. The frame members can include pairs of elongated relatively thin planar ribs extending along the length of one or more sides of the frame member. Typically, the ribs extend normal to a flat surface defined by the side of the frame member. The ribs form a track in which panels or widows can be inserted therebetween to secure the panel or window to the frame member. The ribs of adjacent frame members are dimensioned and oriented so that they are in alignment with each other and are generally coplanar to form a continuous track surrounding the periphery of the panel or window. If the frame member is formed by an extrusion process, the ribs can easily be formed integrally with the extruded outer casing.

Generally, the frame members are positioned and fastened together such that an end of one frame member abuts a side of another frame member. The frame members are commonly at right angles with respect to one another and form what is known in the art as a butt joint. It is known to fasten frame members by conventional angle brackets having a pair of relatively flat legs perpendicular to one another. The legs of the bracket are fastened to the adjacent sides of the adjoining frame members, such as by self-tapping screws.

It is also known to use an insert to assist in fastening frame members together. There is illustrated in FIG. 1, a joint, indicated generally at 100, for use in a conventional known prior art patio enclosure. The joint 100 is formed by joining a first frame member 102 to a second frame member 104 with the aid of an insert 106. The frame members 102 and 104 are similar in structure. The frame members 102 and 104 are composite frame members having a polymeric outer casing 108 and a rigid inner core 110. The frame members 102 and 104 include outwardly extending ribs 112 to form tracks for retaining doors, windows, and panels of the patio enclosure. The insert 106 is generally U-shaped having a pair of spaced apart parallel legs 114 joined by a web 116. The insert 106 and the inner cores 110 of the frame members 102 and 104 are formed of aluminum, a relatively rigid material.

To form the joint 100, the web 116 of the insert 106 is fastened to a side surface 118 of the frame member 102 by a threaded fastener (not shown). The legs 114 of the insert 106 are then inserted into a bore 120 of the inner core 110 of the frame member 104. The legs 114 of the insert 106 are then fastened to the side of the frame member 104 by threaded fasteners threaded through a side wall 121 of the frame member 104.

To form a relatively secure joint, a structural end of the frame member 104 should be in abutment with the structural side of the frame member 102. Since the outwardly extending ribs 112 of the frame members 102 and 104 are oriented so that they align with each other, the end of the frame member 104 will not abut the flat side surface 118 of the mating frame member 102 due to the interference from the ribs 112. In other words, the end of the frame member 104 will abut the outer edges of the ribs 112 of the frame member 104. Fastening the frame members 102 and 104 at this displacement position is undesirable because of the formation of a relatively weak joint due to the lack of direct contact of the structural members. To overcome this problem, portions of the frame members, such as the ribs 112, from one or both of the frame members 102 and 104 are removed or cut out to form notches. For example, as shown in FIG. 1, notches 122 are formed in the ribs 112 of the frame member 104. The length of the notch 122 corresponds to the width of the rib 112 extending from the side surface 118. The notch 122 provides clearance for the ribs 112 of the end of the frame member 104 from interfering with the ribs 112 of the frame member 102 when the end of the frame member 104 is positioned adjacent the side surface 118 of the frame member 102. A generally rectangular notch 124 is formed in the side surface 118 of the frame member 102 corresponding to the dimensions of the web 116 of the insert 106. The notch 124 allows direct contact between the web 116 of the insert 106 and the inner core 110 of the frame member 103. Since the surface area of the web 116 is relatively small, the insert 106 is mounted directly to the surface of the inner core 110.

The appropriate portions (notches) of the frame members can be removed manually by hand tools or by power tools, such as routers or milling machines. Special cutting tools have been developed to cut an appropriate notch into the frame members. However, these cutting tools can be relatively expensive, especially if different configurations of notches must be machined corresponding to frame members having different cross-sections.

Although the removal of the portions of the frame members overcomes the problem of joining the structural portions of the frame members to form a butt joint, it is very time consuming and intricate. Commonly, the frame members are provided in relatively long lengths, such as 20 feet in length, and are cut to the appropriate size at the job site where the patio enclosure is being built. If the frame members are sized at the job site, the appropriate tools must be available to remove the appropriate portions of the frame embers to accommodate the butt joint. To avoid having the workers on the job site cutting the appropriate notches, it is known to cut the frame members at a manufacturing facility prior to assembly at the job site. However, any complications, such as inaccurate measurements or inventory errors, will complicate assembly of the patio enclosure because of non-mating frame members. Often, the workers must notch the frame members using hand tools regardless of having the premeasured and notched frame members.

BRIEF SUMMARY OF THE INVENTION

This invention relates to a fastener for use in forming a joint of a framework for a patio enclosure. The joint includes an end of an elongated first frame member fastened to a side of an elongated second frame member. The fastener provides a rigidly secure attachment between the structural features of the first and second frame members such that forces or loads from one frame member will be substantially transmitted to the other frame member through the fastener. The fastener also properly positions the first and second members such that non-structural ribs integrally formed on the first and second frame members are flush with one another and will not interfere with the rigidly secure attachment of the frame members.

The fastener includes a body having a first end and a second end defining an outer surface therebetween. The second end is adapted to fit in a hollow portion of the first frame member. The fastener further includes a plate extending outwardly from the body. The plate is adapted to be fastened to the side portion of the second frame member. A stop extends outwardly from the outer surface of the body. The stop provides for positioning of the fastener relative to the first frame member when the second end is positioned within the hollow portion of the first frame member. Preferably, the stop is defined as a shoulder formed on the body of the fastener. The shoulder functions as a spacer to space the end of the first frame member by a distance relative to the side portion of the second frame member so that the integrally formed ribs of the first frame member are positioned flush against the ribs of the second frame member.

Various objects and advantages of this invention will become apparent to those skilled in the art from the following detailed description of the preferred embodiment, when read in light of the accompanying drawings.

DETAILED DESCRIPTION OF THE INVENTION

Figure 2:
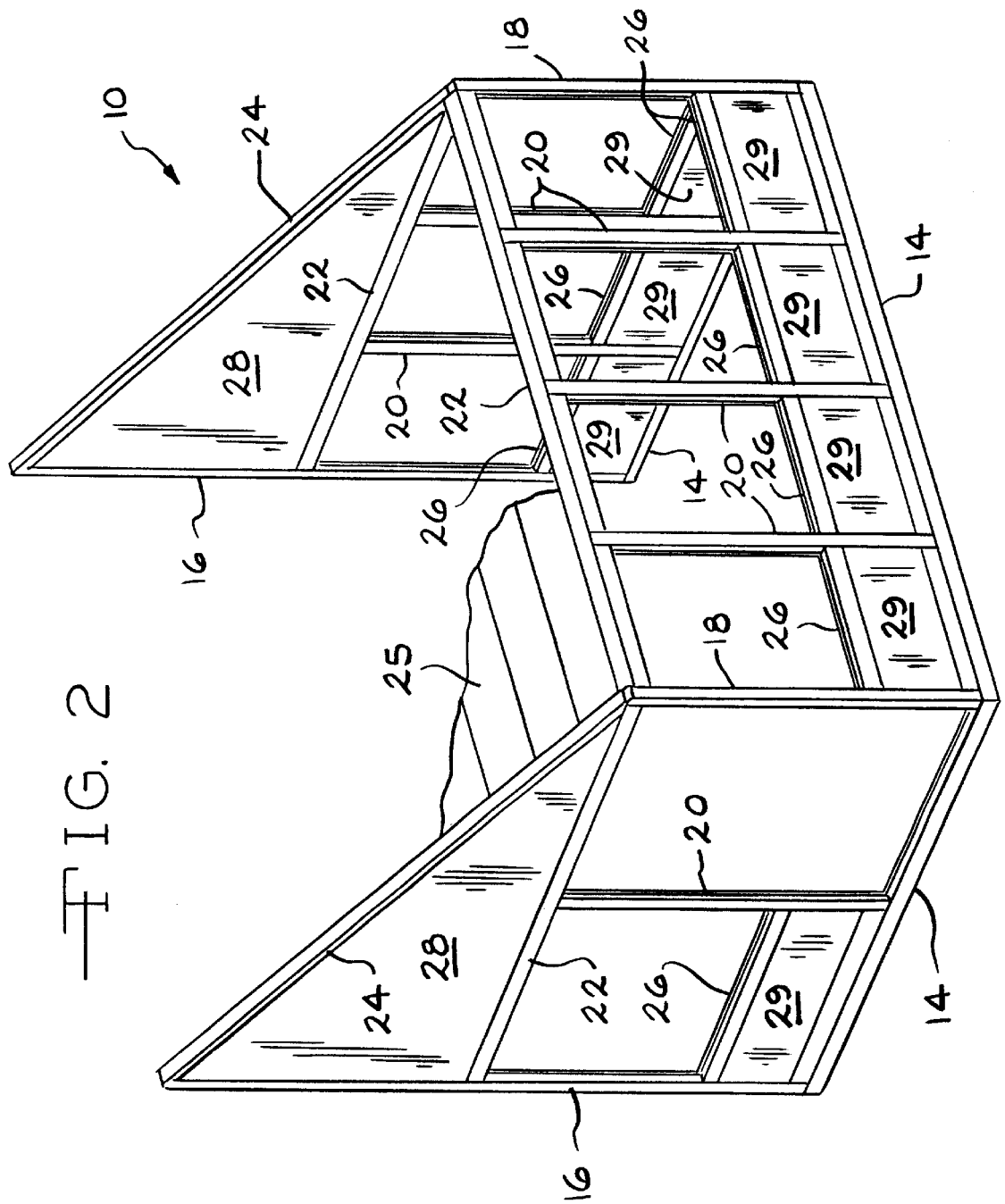
FIG. 2 is schematic perspective view of a patio enclosure including a plurality of frame members attached together by a fastener, in accordance with the present invention.

Referring now to the drawings, there is illustrated in FIG. 2 a patio enclosure, indicated generally at 10. The patio enclosure 10 is constructed from a plurality of elongated beams or frame members which are fastened together to form a framework which provides the structural integrity and shape of the patio enclosure 10. As will be discussed in detail below, the frame members are fastened together at joints with the assistance of a fastener 12, shown in FIGS. 3 through 5, in accordance with the present invention.

Figure 1:
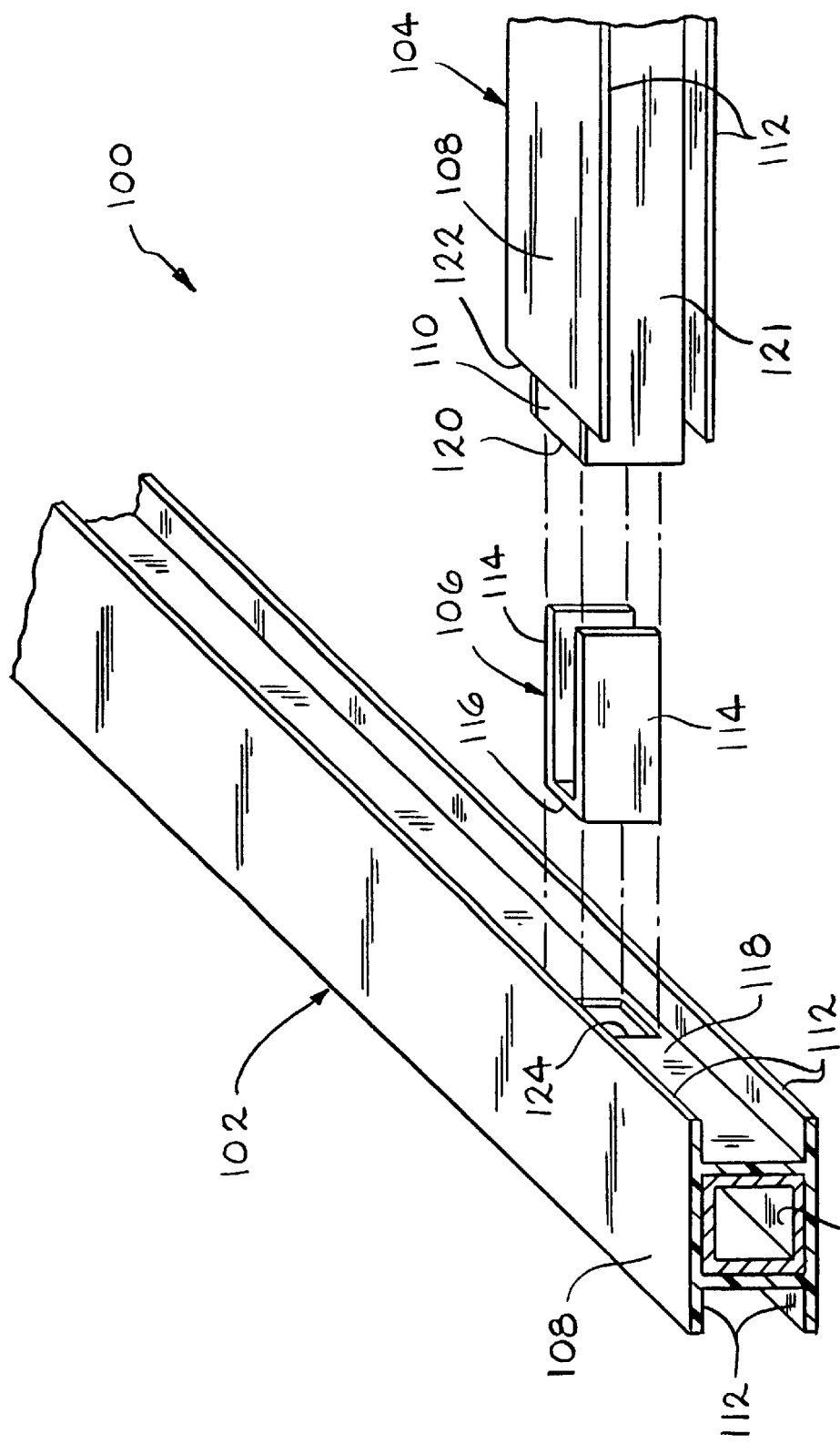
FIG. 1 is an exploded perspective view of a joint of a pair of frame members in a conventional prior art patio enclosure.

In the embodiment of the patio enclosure 10 illustrated in FIG. 1, the framework includes horizontally oriented floor joists 14 which can be secured to any suitable flooring, such as a concrete footer, concrete slab, or wood decking. A pair of vertically oriented end jambs 16 extend upwardly from ends of the floor joists 14. The end jambs 16 can be fastened directly to a building, such as a residential dwelling, of which the patio enclosure is attached. A pair of vertically oriented corner posts 18 are attached to the other ends of the floor joist 14. The end jambs 16 and the corner posts 18 define corners of the patio enclosure 10. Of course, the patio enclosure 10 can also be a free standing structure in which the corner posts 18 are used for the corners of the structure. Located between the end jambs 16 and the corner posts 18 are a plurality of vertically oriented columns 20. The patio enclosure 10 can include any number of columns 20 for aesthetic purposes or to provide structural rigidity for the patio enclosure. Fastened to the upper portions of the end jambs 16, corner posts 18, and columns 20 are horizontally oriented headers 22. A pair of angled roofing headers 24 extend between the upper portions of the end jambs 16 and the corner posts 18. Any suitable roofing structure 25 can be attached to and extend between the roofing headers 24 and front header 22. The patio enclosure can also include horizontally oriented sills 26 extending between adjacent sides of columns 20, corner posts 18, and end jambs 16.

As used throughout this specification the floor joists 14, end jambs 16, corner posts 18, columns 20, headers 22, roofing headers 24, and sills 26 define beams or frame members which can be fastened together to form a patio enclosure. As will be discussed below, the floor joists 14, end jambs 16, corner posts 18, columns 20, headers 22, roofing headers 24, and sills 26 can have the same cross-sectional shape or any other suitably shaped cross section, in accordance with the present invention.

The patio enclosure 10 can include any number of suitable, panels, screens, windows, or doors disposed between various frame members to form the patio enclosure 10. For example, the patio enclosure 10 can include triangular shaped gable end panels 28 disposed between adjacent roofing headers 24, headers 22, and end jambs 16. The patio enclosure 10 can further include kick panels 29 disposed between adjacent floor joists 14, columns 20, and sills 26.

It should be understood that the patio enclosure 10 illustrated in FIG. 2 is only one embodiment of a patio enclosure and any suitably shaped patio enclosure, in accordance with the present invention, can be formed of any number of frame members oriented in any orientation. It should also be understood that the joint and fastening method of the frame members of the present invention can be used in any patio enclosure or other building structure, and should not be limited to the illustrated embodiment.

Figure 3:
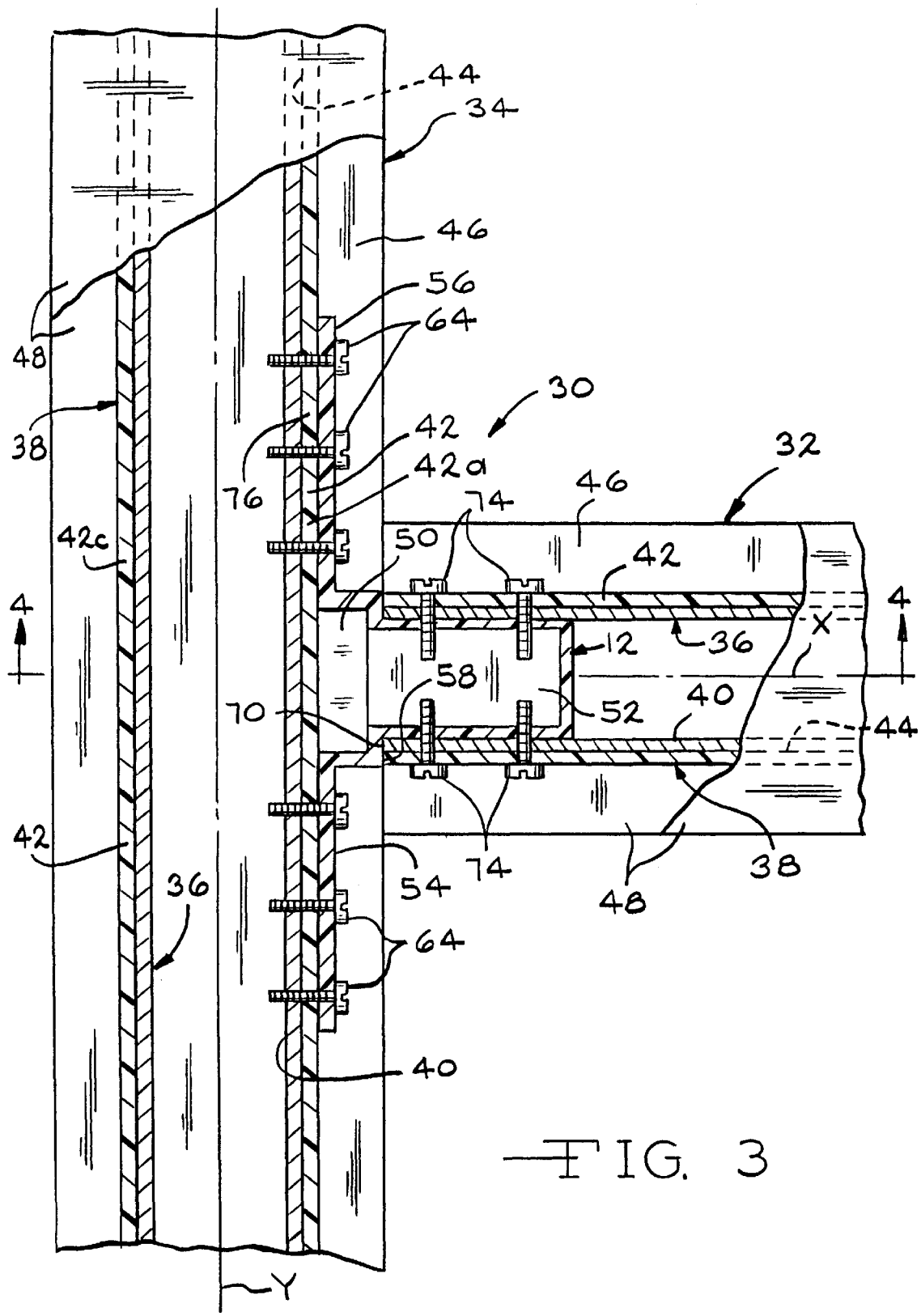
FIG. 3 is enlarged partial sectional front view of a joint of a pair of frame members illustrated in FIG. 2.
Figure 4:
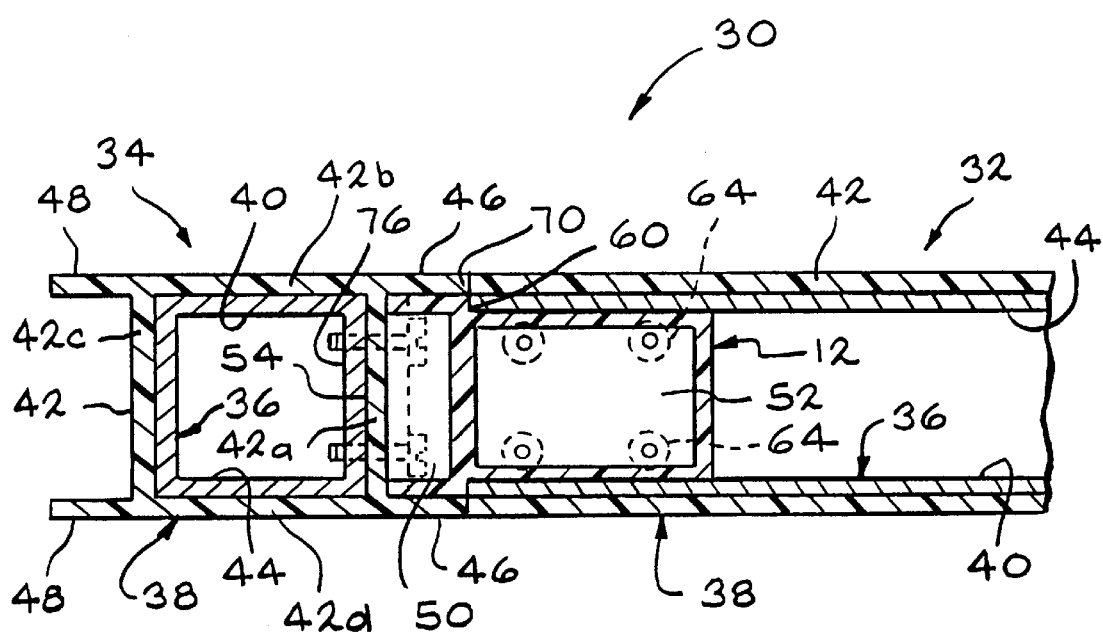
FIG. 4 is a partial sectional view of the joint taken along Lines 4—4 in FIG. 3.

There is illustrated in FIGS. 3 and 4 a joint, indicated generally at 30, which fastens a first frame member 32 to a second frame member 34 via the fastener 12. The frame members 32 and 34 can be any ones of the floor joists 14, end jambs 16, corner posts 18, columns 20, headers 22, roofing headers 24, and sills 26 described above with respect to the patio enclosure 10. For example, the first frame member 32 can be a sill 26, and the second frame member 34 can be a column 20 from the patio enclosure 10 of FIG. 2. The frame members 32 and 34 can be similar to one another having the same general cross-sectional shape and made from the same material. Thus, different frame members, such as the sills 26 and the columns 20, can be formed from the same frame member stock. As will be discussed below, the frame members can have different cross-sectional shapes than the illustrated frame members 32 and 34.

Since the frame members 32 and 34 are preferably made from the same stock, only the frame member 32 will be described in detail for clarity. Like reference numbers will be used in the figures and described herein for similar structures and features of both frame members 32 and 34. The frame member 32 is preferably a composite frame member including an inner core 36 and an outer casing 38. Generally, the inner core 36 is preferably made of a relatively rigid material to provide rigidity and structural integrity to the frame member 32. The inner core 36 is preferably made of aluminum but can be made of any suitable metal or sufficiently rigid material. As best shown in FIG. 3, the inner core 36 of the frame member 32 or 34 is generally rectangular in cross-sectional shape having a generally rectangular bore or hollow interior 40. Of course, the inner core 36 can have any suitable cross-sectional shape, such as the cross-sectional shape of a conventional I-beam. Due to its continuous cross-sectional shape, the inner core 36 is preferably formed by an extrusion process.

The outer casing 38 is preferably made of a suitable material having weather resistant properties having an aesthetically pleasing appearance. Preferably, the outer casing 38 is made of polyvinyl chloride but can be made of any suitable polymeric material or any other material having weather resistant and aesthetic properties. The outer casing 38 includes a body portion 42 having a generally rectangular cross-sectional shape. The body portion 42 has a bore or hollow interior 44. Due to its continuous cross-sectional shape, the outer casing 38 is preferably formed from by an extrusion process. The hollow interior 44 of the outer casing 38 is dimensioned to receive the inner core 36. To form the frame member 32, the inner core 36 can simply be inserted into the hollow interior 44 of the outer casing 38. Preferably, the entire outer periphery of the inner core 36 is surrounded by the body 42 of the outer casing 38 so that the walls formed thereof are flush with each other.

As best shown in FIG. 4, the generally rectangular body portion 42 of the outer casing 38 has four sides 42a, 42b, 42c, and 42d. The outer casing 38 includes a pair of opposed ribs 46 extending outwardly at a generally perpendicular angle with respect to the sides 42a of the body portion 42. For aesthetic reasons, the ribs 46 are preferably generally flush and coplanar with the respective sides 42b and 42d of the body portion 42. The ribs 46 are relatively thin planar structures which form a track to retain a panel, window, screen, or door (not shown) disposed between the ribs 46. If the frame member is used as a column 20 of the patio enclosure 10, the body portion 42 of the outer casing 38 preferably includes a pair of ribs 48 extending outwardly at a generally perpendicular angle with respect to the side 42c of the body portion 42. The ribs 48 are similar in structure and function to the ribs 46. Of course, the outer casing 38 can include any number of opposed ribs on any one of the sides 42a, 42b, 42c, and/or 42d corresponding to the type of frame member used. For example, a corner post would have ribs extending from adjacent sides, such as corresponding sides 42a and 42b.

Although the frame member 32 is described as being formed from two materials (the inner core 36 and the outer casing 38), the frame member 32 can be made of a single material having sufficient strength, endurance, and aesthetic properties. For example, the frame member can be made of LEXAN, ABS plastic, polyvinyl chloride, urethane, manufactured by an extrusion process.

Figure 5:
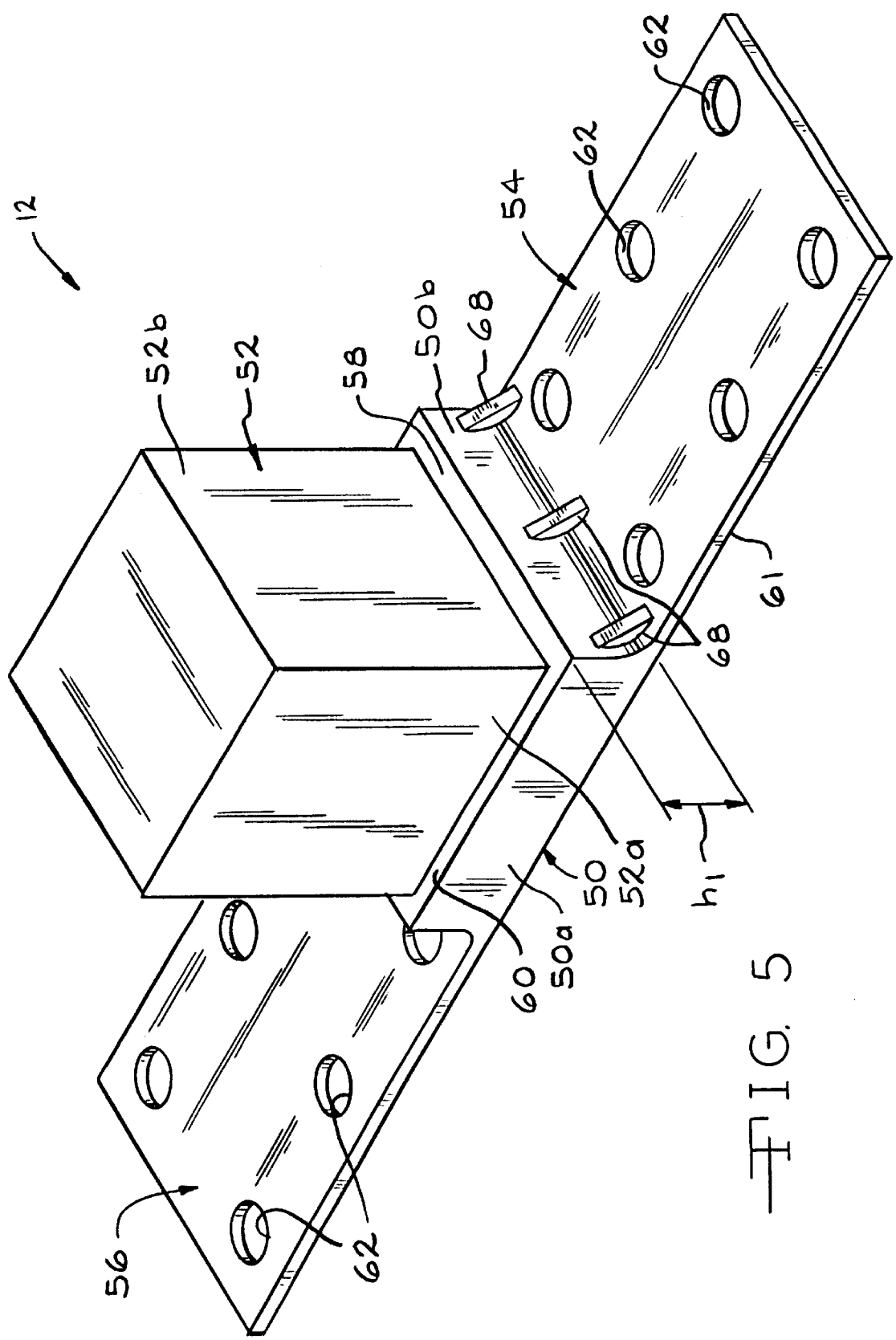
FIG. 5 is a perspective view of the fastener of the joint illustrated in FIG. 3.

As stated above, the joint 30 includes a fastener 12. As shown in FIGS. 2 through 5, the fastener 12 generally includes a body portion 50, an extension portion 52, and pair of extensions or plates 54 and 56. The body portion 50 is generally rectangular in shape having two pairs of opposed sides 50a and 50b. The body portion has a height $h_1$, as shown in FIG. 5.

The extension portion 52 is also generally rectangular in shape having two pairs of opposed sides 52a and 52b. Preferably, the sides 52a of the extension portion 52 are slightly smaller in width than the sides 50a of the body portion 50, thereby forming opposed shoulders 58, the reason for which will be explained below. Preferably, the sides 52b of the extension portion 52 are slightly smaller in width than the sides 50b of the body portion 50, thereby forming opposed shoulders 60.

The plates 54 and 56 of the fastener 12 extend outwardly from the sides 50b of the body portion 50. Preferably, the plates 54 and 56 are relatively flat structures to provide less interference for structures such as doors, windows, and screens positioned within the tracks formed from the ribs 46 and 48 of the frame members 32 and 34. Of course, the plates 54 and 56 can have any suitable shape to provide mounting locations for securing the fastener 12 to the second frame member 34, as described below. The plates 54 and 56 and an end of the body portion 50 define a generally flat surface 61 which abuts against the side 42a of the second frame member 34 when forming the joint 30, as will be discussed in detail below. The plates 54 and 56 of the fastener 12 preferable include apertures 62 for receiving conventional threaded fasteners, such as self-tapping screws 64, as shown in FIGS. 2 and 3. The fastener 12 can include any number of plates 54 and 56 extending from any of the sides 50a and 50b of the body portion 50 depending on the configuration of the frame members used for a joint. For example, if the fastener 12 is used to fasten a corner post 18 to a pair of adjoining floor joists 14 of the patio enclosure 10 of FIG. 1, the fastener 12 preferably has a plate extending from one of the sides 50a and another plate extending from one of the sides 50b. For this configuration, the shoulders 58 and 60 may have the same dimensions for flushness with the frame members, as described below.

Preferably, the body portion 50, the extension portion 52, and the pair of plates 54 and 56 of the fastener 12 are integrally formed as one piece. The fastener 12 can be made of any sufficiently rigid material, such as aluminum or Nylon Type 66, and is preferably manufactured by an injection molding or casting process. Preferably, the body portion 50 and extension portion 52 are hollowed out for weight reduction and ease of manufacture. The fastener 12 can further include structural features, such as structural ribs 68, shown in FIG. 4, to provide a relatively strong connection between the plates 54 and 56 and the body portion 50.

To fasten the joint 30, the extension portion 52 of the fastener 12 is inserted into the hollow interior 40 of the inner core 36 of the first frame member 32. Preferably, the cross-sectional shape of the extensions portion 52 fits snugly within the hollow interior of the inner core 36. The extension portion 52 is inserted until the shoulders 58 and 60 abut an end 70 of the inner core 36 of the first frame member 32. The shoulders 58 and 60 define a stop, in accordance with the present invention, for positioning the fastener 12 relative to the frame member 32. Although the embodiment of the fastener 12, shown in FIGS. 2 through 5, provides shoulders 58 and 60, it should be understood that any suitable structural feature may be used as a stop. For example, the body 50 and the extension 52 can be formed such that they have the same cross-sectional dimensions to form a single continuous body portion. The continuous body portion could have a raised protrusion, rib or dimple extending outwardly from an outer surface of the body portion at a position corresponding to the position of the shoulders 58 and 60. Thus, the stop can be any suitable structural extending from the outer surface of the fastener 12 to help position the fastener 12 relative to the frame member 32. Preferably, the stop contacts a substantial portion of the end 70 of the inner core 36 to assist in transmitting forces between the fastener 12 and the frame member 32.

Preferably, the end 70 of the inner core 36 of the first frame member 32 has a generally hollow rectangular shape defining a plane which is generally perpendicular to a longitudinal axis X of the first frame member 32, and generally parallel with a longitudinal axis Y of the second frame member 34, as shown in FIG. 3. The fastener 12 is preferably fastened to the inner core 36 of the first frame member 32 by a plurality of threaded fasteners, such as self tapping screws 74. Of course, the fastener 12 can be attached to the inner core 36 by any suitable manner, such as by an adhesive. The direct contact engagement between the fastener 12 and the inner core 36 provide a rigidly secure attachment or relationship therebetween such that forces or loads will be substantially transmitted between the fastener 12 and the inner core 36, and not through the less rigid outer casing 38 of the first frame member 32. In the illustrated embodiment of the fastener 12, the contact engagement between the shoulders 58 and 60 and the end 70 of the inner core 36 provide the rigid securement. Although the fastener 12 is shown and described with two pairs of shoulders 58 and 60, the fastener 12 can be configured without any shoulders or with any number of shoulders, as discussed above. The fastener 12 could be manufactured without shoulders 58 and 60 but include a structural stop so that the fastener 12 is inserted into the hollow interior 40 of the inner core 36 to properly position the fastener 12 relative to the first frame member 32. The snug fit between the fastener 12 and the inner core 36 of the first frame member 32 in cooperation with the screws 74 would provide a substantially rigid securement between the fastener 12 and inner core 36 of the first frame member 32.

The fastener 12 is then attached to the second frame member 34. As shown in FIGS. 3 and 4, the plates 54 and 56 of the fastener 12 are preferably attached to the second frame member 34 by the screws 64 at any desired location along the length of the second frame member 34. Since a wall 76 of the body 42 of the outer casing 38 of the second member 34 is disposed or sandwiched between the flat surface 61 of the fastener 12 and a side wall of the inner core 36 of the second frame member 34, a relatively rigid and secure attachment is formed therebetween. Furthermore, the relatively large surface area of the flat surface 61 relative to the end 70 of the frame member 34 provides a relatively rigid and secure attachment. Thus, the fastener 12 provides a rigid and secure joint between the inner cores 36 of the first and second frame members 32 and 34 so that the load or forces acting on frame members 32 and 34 are substantially transmitted through the fastener 12.

The height $h_1$ of the body portion 50 of the fastener 12 is preferably equal to or slightly less than the height of the ribs 46 of the second frame member 34 so that the end of the first frame member 32 is properly positioned such that the ribs 46, 48 of the frame members 32 and 34, respectively, are flush to form a continuous track, as shown in FIGS. 3 and 4.

The width of the shoulders 58 are preferably equal to the total thickness of the wall of the inner core 36 and wall of the outer casing 38 so that the sides 50b of the body portion 50 of the fastener 12 are flush with the sides 42a of the outer casing 38 of the first frame member 32. The widths of the shoulders 60 are preferably equal to the thickness of the wall of the inner core 36 of the outer casing 38 so that the sides 50a of the body 50 of the fastener 12 are positioned adjacent to and between the ribs 46 of the second frame member 34, as shown in FIG. 4.

The shoulders 58 and 60 function as a spacer to space the end 70 of the first frame member 32 by a distance relative to the outer surface of the side 42a of the outer casing 38 of the second frame member 34 so that the edges of the ribs 46 and 48 of the first frame member 32 are positioned flush against the ribs 46 of the second frame member 48. One of the advantages of using the fastener 12, is that the end 70 of the first frame members 32 can be simply cut or squared off at the appropriate length for forming the joint. There is no need to trim or form notches in either of the frame members prior to fastening. Therefore, lengths of frame members can be easily cut at a job site without having to form intricate notches.

Although the joint 30 is illustrated and described as a butt joint in which the axis X and Y of the first and second frame members, respectively, are normal to one another, the joint 30 can be formed at an angle to accommodate frame members which are joined together at angles other than 90 degrees.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A joint for attaching an end of a first frame member to a side portion of a second frame member of a framework of a patio enclosure, said joint comprising:

a first frame member having first and second opposed sides, a pair of spaced apart first ribs extending outwardly from said first side, and a pair of spaced apart second ribs extending outwardly from said second side, said first frame member having an end having a hollow portion formed therein;

a second frame member having a third side and pair of spaced apart third ribs extending outwardly from said third side of said first frame member; and a fastener including:

a body having a first end and a second end defining an outer surface therebetween, said second end disposed in said hollow portion of said end of said first frame member, said second end of said body fastened to said first frame member;

a plate extending outwardly from said body, said plate fastened to said third side of said second frame member; and a stop extending outwardly from said outer surface of said body, said stop positioned adjacent said end of said first frame member.

2. The joint of claim 1, wherein said first and second frame members have the same cross-sectional shape.

3. The joint of claim 2, wherein said the cross-sectional shape of said first and second frame members is continuous.

4. The joint of claim 2, wherein said first and second frame members include a rigid inner core and an outer casing substantially covering said inner core, and wherein said inner core defines said hollow portion of said end of said first frame member.

5. The joint of claim 1, wherein one said pair of third ribs is coplanar with said first ribs of said first frame member, and the other of said third ribs is coplanar with said second ribs of said first member.

6. The joint of claim 1, wherein said stop is positioned at said first end of said body such that said pair of third ribs are flush with said first and second ribs.

7. The joint of claim 1, wherein said stop is integrally formed in said body.

8. The joint of claim 1, wherein said body includes a stepped extension portion formed at said second end of said body, said extension having a width less than the width of said body to form a shoulder, and wherein said shoulder defines said stop.

9. The joint of claim 8, wherein said body and said extension portion have a generally rectangular cross-section.

10. The joint of claim 8, wherein said shoulder extends from said extension portion by a distance approximately equal to the thickness of said first rib of said first frame member.

11. The joint of claim 8, wherein said first and second frame members include a rigid inner core and an outer casing substantially covering said inner core, and wherein said inner core defines said hollow portion of said end of said first frame member, said hollow portion of said inner core defining a wall adjacent said third side of said second frame member, said shoulder extending from said extension portion by a distance approximately equal to the combined thickness of said wall of said inner core and the thickness of said third side of said second frame member.

12. The joint of claim 1, wherein said plate is substantially flat.

13. The joint of claim 1, wherein said plate is integral with said body.

14. The joint of claim 1, wherein said plate of said fastener extends outwardly from said body in a first direction, and wherein said fastener further includes a second plate extending outwardly from said body in a second direction different from said first direction.

15. A method of fastening an end of a first frame member to a second frame member of a patio enclosure, the method comprising the steps of:

a) providing an elongated first frame member, the first frame member having an end with a hollow portion formed therein;

b) providing an elongated second frame member having a side wall;

c) providing a fastener including a body having a first end and a second end defining an outer surface therebetween, a plate extending outwardly from the body, and a stop extending outwardly from the said outer surface of said body;

d) inserting the second end of the fastener in the hollow portion of the first frame member such that the stop of the fastener abuts the end of the first frame member;

e) fastening the second end of the fastener to the first frame member; and f) fastening the plate of the fastener to the second frame member.

* * * * *